United States Patent [19]

Kinney

[11] Patent Number: 5,312,544

[45] Date of Patent: May 17, 1994

[54] CONTINUOUS STRAINER

[75] Inventor: Craig S. Kinney, Sewickley, Pa.

[73] Assignee: S. P. Kinney Engineers, Inc., Carnegie, Pa.

[21] Appl. No.: 965,763

[22] Filed: Oct. 23, 1992

[51] Int. Cl.⁵ .................. B01D 33/06; B01D 33/39
[52] U.S. Cl. .................... 210/107; 210/108; 210/138; 210/297; 210/315; 210/391; 210/411
[58] Field of Search .............. 210/391, 392, 393, 394, 210/396, 398, 407, 408, 411, 413, 414, 297, 315, 324, 107, 108, 138, 139; 162/251, 55

[56] References Cited

U.S. PATENT DOCUMENTS

| | | | |
|---|---|---|---|
| 1,328,044 | 1/1920 | Hills | 210/315 |
| 1,926,646 | 9/1933 | Lampen | 210/315 |
| 1,931,764 | 10/1933 | Lawson | 210/315 |
| 1,945,839 | 2/1934 | Von Maltitz | 210/411 |
| 2,206,593 | 7/1940 | Beebe | 210/315 |
| 2,747,741 | 5/1956 | Jacobson | 210/411 |
| 3,074,560 | 1/1963 | Kinney | 210/411 |
| 3,168,467 | 2/1965 | Dreyer | 210/411 |
| 3,176,846 | 4/1965 | Adams | 210/411 |
| 3,256,995 | 6/1966 | Schmid et al. | 210/411 |
| 3,327,861 | 6/1967 | Carr | 210/411 |
| 3,357,566 | 12/1967 | Schmid et al. | 210/411 |
| 3,635,348 | 1/1972 | Carr | 210/413 |
| 3,797,662 | 3/1974 | Titus | 210/403 |
| 3,814,244 | 6/1974 | Young | 210/411 |
| 4,041,560 | 8/1977 | Jacobsen | 210/391 |
| 4,297,209 | 10/1981 | DeVisser et al. | 210/411 |
| 4,315,820 | 2/1982 | Mann et al. | 210/411 |
| 4,328,103 | 5/1982 | Kraeling Jr. et al. | 210/411 |
| 4,634,521 | 1/1987 | Simola et al. | 210/413 |
| 4,818,402 | 4/1989 | Steiner et al. | 210/411 |
| 4,840,047 | 6/1989 | Richter et al. | 210/411 |

OTHER PUBLICATIONS

S. P. Kinney Co., Bulletin 516.1, Sep. 1990.

Primary Examiner—Peter A. Hruskoci
Assistant Examiner—Robert James Popovics
Attorney, Agent, or Firm—Armstrong, Westerman, Hattori, McLeland & Naughton

[57] ABSTRACT

A continuous, self-cleaning strainer and method of straining comprising a housing, a rotatably driven shaft mounted on the housing, a primary and a secondary drum concentrically mounted on the shaft and rotatable therewith, the drums having a number of perforations and strainer inserts mounted in each of the perforations, each drum being provided with a reduced pressure backwash zone outside the drum and connected to backwash outlet connected to atmospheric pressure whereby, when a strainer insert passes the reduced pressure zone, pressurized liquid inside the drum forces liquid backwardly through the insert to flush accumulated solids therefrom. Backwashing operation can be commenced by means of a valve disposed in the backwash outlet lines and actuated by a timer or by a pressure differential switch, or both.

16 Claims, 4 Drawing Sheets

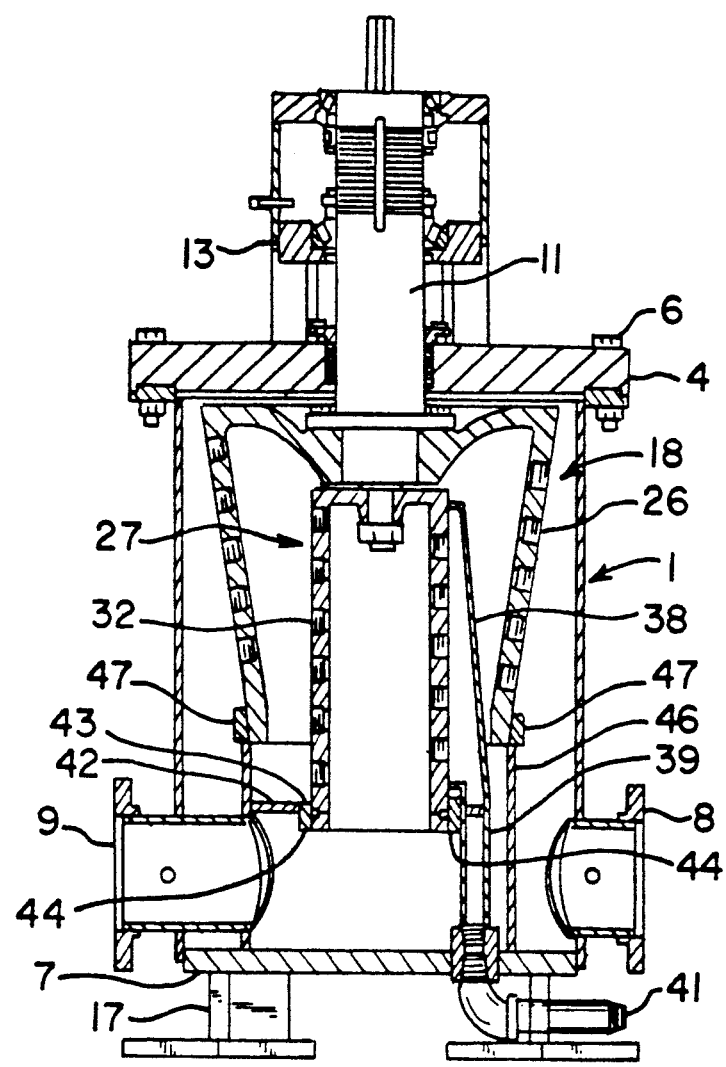
FIG_5
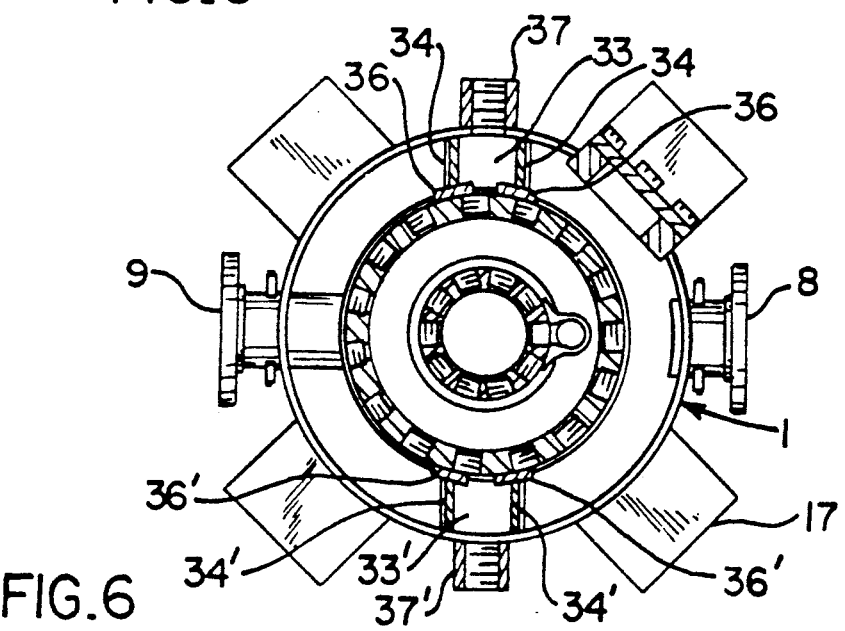
FIG.6

CONTINUOUS STRAINER

BACKGROUND OF THE INVENTION

1. Field of the Invention

This invention relates to the field of straining entrained solids from liquids, and more particularly to means and methods for passing the liquid material to be strained, under superatmospheric pressure, successively through a plurality of perforated drums having a corresponding number of media strainer inserts inserted within the perforations of the respective drums, whereby entrained solids are removed from the strained liquid by entrapment of the solids by the inserts. The invention is especially directed to such means and methods whereby, by creation of zones of reduced pressure along a dimension of each drum along which the inserts are disposed, and by rotating the drums, as the inserts pass through the reduced pressure zones, the higher pressure of liquid within the drums forces liquid through the inserts in the direction of reduced pressure and opposite the straining direction, thereby removing entrapped solids from the inserts and providing a automatic cleaning function.

2. Description of Related Art

The prior art includes strainers of the general type above described, but provided with a single perforated drum having media strainer inserts mounted within the drum perforations for straining solids contained in a liquid to be treated Such apparatus includes means and methods for automatic continuous self-cleaning by provision of a backwash slot and/or backwash shoe connected to atmosphere, thereby creating a zone of reduced pressure and whereby, on rotation of the drum, as the inserts pass through the reduced pressure zone established by the backwash mechanism, pressure inside the drum forces liquid outwardly of the drum, through the media strainer inserts, and removing entrapped solids therefrom such apparatus is manufactured by the assignee of the present invention.

SUMMARY OF THE INVENTION

In accordance with the present invention, two or more perforated drums are concentrically mounted on a single drive shaft for rotation therewith. Media strainer inserts are mounted in each perforation of the drums Provision of a plurality of such strainer drums provides enhanced straining liquid volume per unit time, as compared to a single drum strainer. Also straining efficiency is improved in that the liquid to be strained is first passed through a primary, outer drum in which the media strainer inserts may inserts of one type, e.g. those having comparatively larger openings for entrapment of larger suspended particles. A secondary, inner drum is provided with media strainer inserts of a different type, e.g. those having smaller openings for straining from the liquid particles of a smaller size.

BRIEF DESCRIPTION OF THE DRAWINGS

FIG. 5 is an elevational view taken along line V—V of FIG. 1.

FIG. 6 is cross-sectional plan view taken along line VI—VI of FIG. 3.

DESCRIPTION OF PREFERRED EMBODIMENTS OF THE INVENTION

Figure 1:
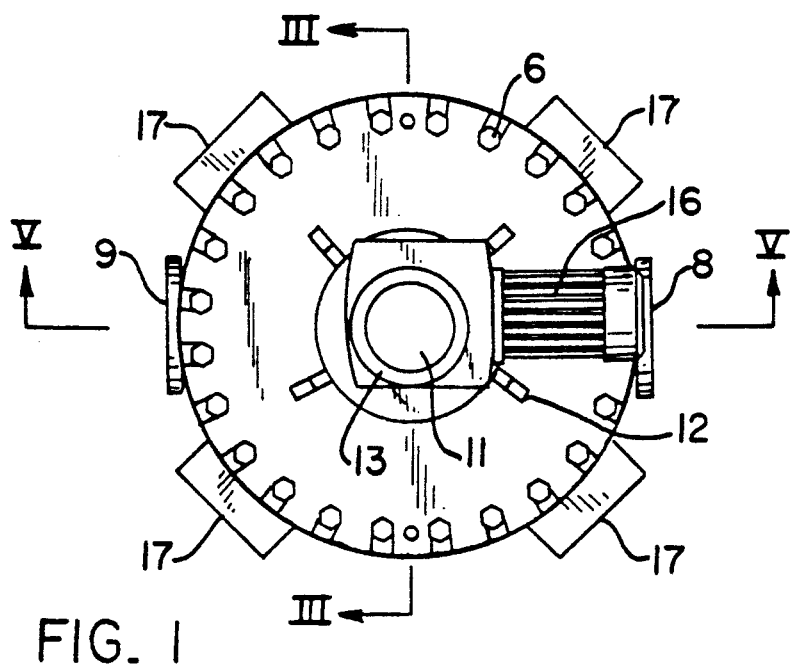
FIG. 1 is a top plan view of the strainer of the invention.
Figure 2:
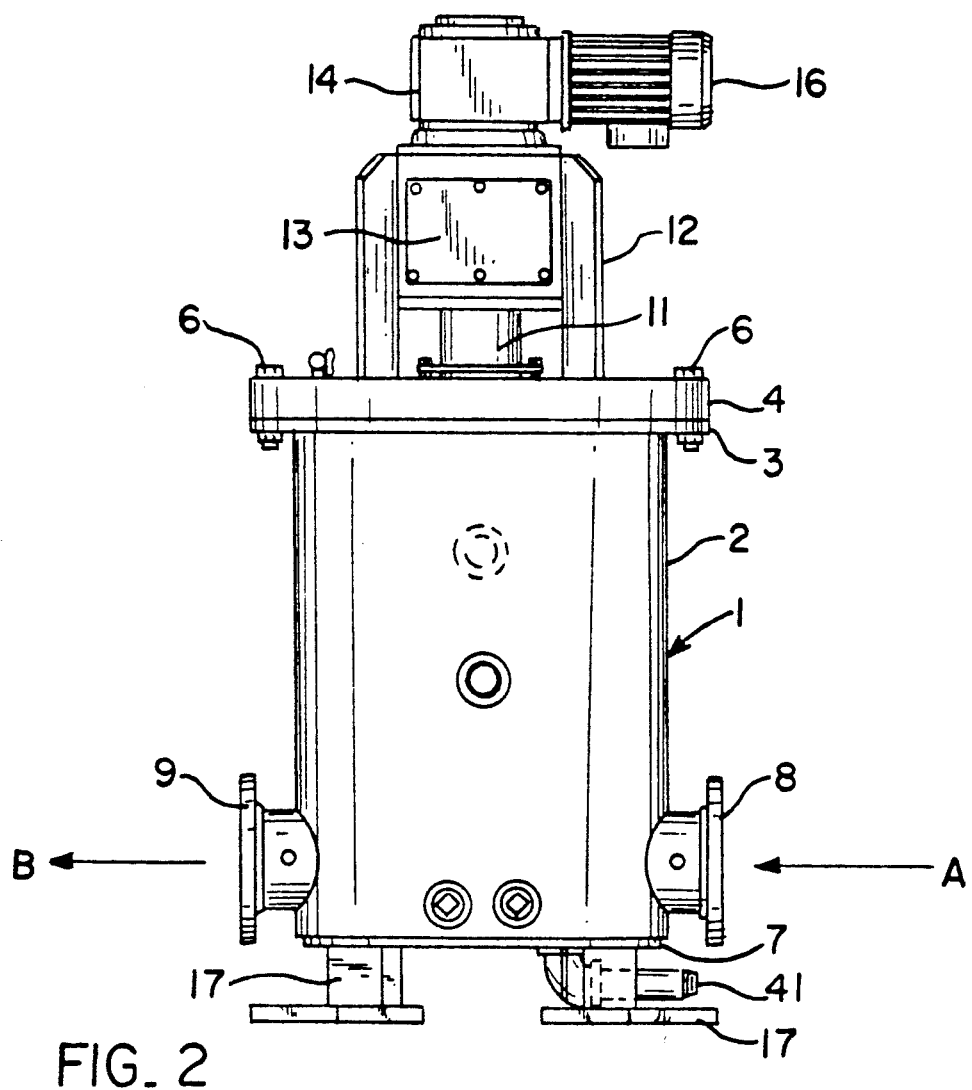
FIG. 2 is an elevational view of the strainer of the invention.

In FIGS. 1 and 2, the numeral 1 generally denotes a housing having a side wall 2 provided with a flange 3, a head 4 removably secured to the flange 3 by means of bolts 6, and a closed bottom 7. The sidewall 2 of housing 1 is provided with an inlet 8 through which liquid to be strained is introduced within the housing in the direction of the arrow A. An outlet 9 is provided in the sidewall 2 through which strained liquid is withdrawn in the direction of arrow B.

A drive shaft 11 is mounted on the head 4 on stanchions 12 and journaled in journal 13. Shaft II is driven, through drive unit 14, by motor 16.

Housing 1 is mounted on pedestals 17 spaced 45 degrees apart.

Figure 3:
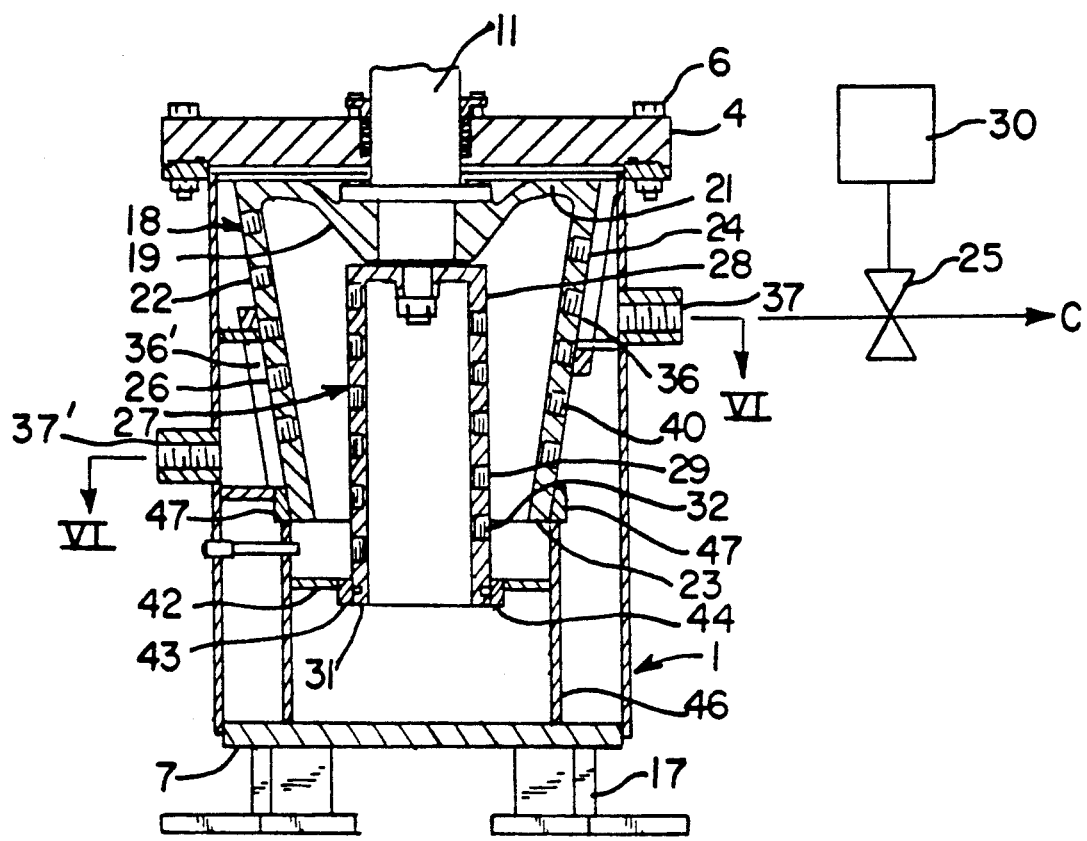
FIG. 3 is a cross-sectional elevation taken along line III—III of FIG. 1.
Figure 4:
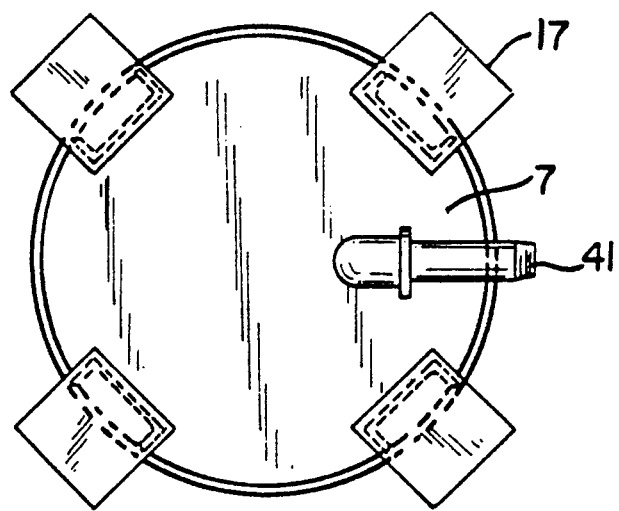
FIG. 4 is a bottom plan view of the strainer of the invention.

Looking next at FIGS. 3 and 4, the numeral 18 generally denotes an outer or primary drum having a flange portion 19 by means of which the drum 18 is affixed to drive shaft 11 to rotate therewith. Drum 18 has a closed top 21 and a side wall 22 terminating in an open bottom 23. Side wall 22 is provided with a plurality of threaded perforations 24. Mounted within the perforations 24 is a set of first threaded media strainer inserts 26.

An inner secondary drum denoted generally by the numeral 27 has a closed top 28 by means of which the drum 27 is affixed to and rotates with the drive shaft I1. Drum 27 has a side wall 29 terminating in an open bottom 31. Drum 27 also is provided with a plurality of threaded perforations 32 in which are mounted a second plurality of threaded media strainer inserts 40.

Figure 7:
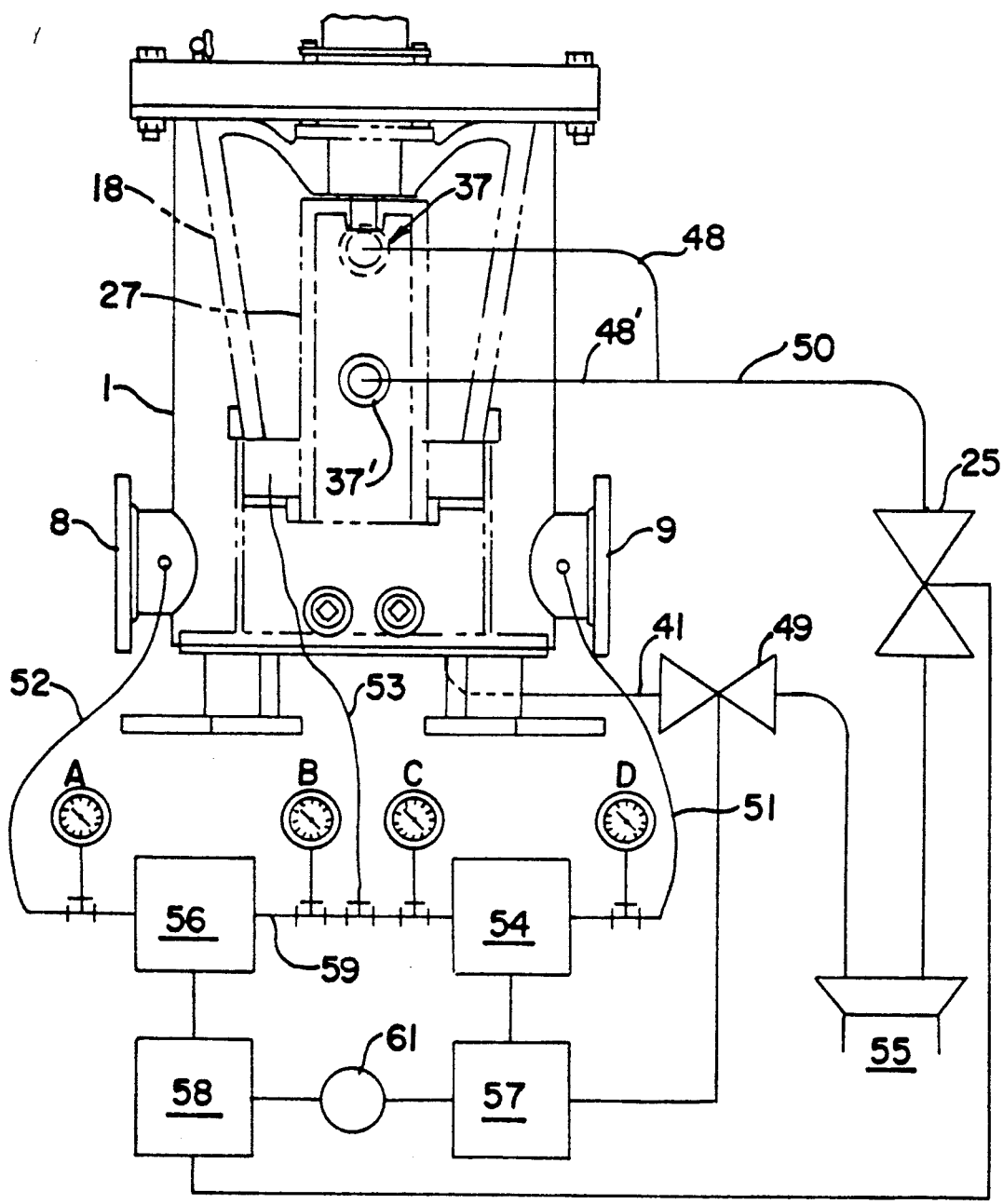
FIG. 7 is a sketch of the apparatus of the invention, showing manifolding of the upper and lower primary drum backwash outlet lines and means for controlling backwashing with pressure differential switches as well as timers.

Turning to FIGS. 5 and 6, in FIG. 5 there is shown an upper primary drum backwash slot 33, formed by a pair of upper backwash slot plates 34. Plates 34 are affixed at one end to a pair of upper slide strips 36 slidably bearing against the outside surface of the primary drum 18. The other ends of plates 34 are affixed to the inner surface of the housing 1. An aperture is provided in the wall of housing between the plates 34 and connects to an upper primary drum backwash slot outlet 37. The upper primary drum backwash slot extends from the closed top of the primary drum to approximately one-half the distance to the open bottom of the primary drum. A similar arrangement, in which similar numerals with a prime (') designation denote similar parts, is provided to form a lower primary drum backwash slot disposed at a location 180 degrees from the upper backwash slot and extending from the open bottom 23 of the primary drum 18 to approximately one-half the distance to the closed top 21 of that drum. Thereby the two backwash slots cover the full length of the primary drum. The upper and lower backwash outlets 37 and 37' are connected, respectively, to an upper backwash outlet line 48 and a lower backwash outlet line 48' of the primary drum (FIG. 7).

In FIG. 5, the numeral 38 denotes a secondary drum backwash shoe which extends along the length of the secondary drum from the closed top to the open bottom thereof and connects near the bottom of the drum with a discharge pipe 39. The latter connects with a secondary drum backwash outlet line 41 extending through the closed bottom 7 of housing 1.

A circular plate 42, having a central aperture 43, surrounds the side wall 29 of the secondary drum 27 adjacent the open end thereof with the side wall 29 projecting into aperture 43, with a slidable sealing means 44 disposed therebetween.

A cylindrical member 46 extends from the open bottom 23 of the primary drum 18, about and affixed to the circular plate 42, and continues downwardly with an end of the cylindrical member 46 affixed to the closed bottom 7 of the housing I. A seal 47 is disposed at the upper end of the cylindrical member 46 and is slidable against the outer surface of the primary drum 18 adjacent the open end thereof.

In operation, the drums are rotated and liquid containing suspended solids to be strained is introduced under pressure, e.g. about 150 psi, through inlet 8 into the space formed by the housing 1, the outside of primary drum 18 and the outside of cylindrical member 46. From this space, the liquid passes through the first set of media strainer inserts 26 in the primary drum 18 into the space formed by the inside of the primary drum, the outside of the secondary drum, the inside of cylindrical member 46 and the upper surface of the circular plate 42. From this space, the liquid passes through the second set of media strainer inserts 40 in the secondary drum 27 into the space formed by the inside of the secondary drum, the lower surface of circular plate 42 and the inside of the cylindrical member 46 below the plate 42. From this latter space, the strained liquid exits the apparatus through outlet 9.

As the drums rotate, successive ones of the primary media strainer inserts 26 pass by the upper and lower backwash slots in the primary drum. At such time, in a backwashing mode as hereinafter described, the superatmospheric pressure within the primary drum forces liquid from the interior of that drum through the inserts 40 due to a lower pressure in the backwash slot, thereby flushing entrapped particles from the media pockets. Such reduced pressure is due to the fact that the backwash slots are in communication with the primary drum upper and lower backwash outlets which go to atmospheric pressure when the apparatus is in the backwashing mode. Similarly, the secondary media strainer inserts 40 pass by the secondary drum backwash shoe—which, through the discharge pipe 39, is in communication with atmospheric pressure through the secondary drum backwash outlet 41 when in backwashing mode. Similarly, the pressure differential between the inside of the secondary drum and atmospheric pressure forces liquid through the secondary drum media strainer inserts 40, thereby flushing entrapped solids therefrom.

Placing the apparatus in backwashing mode will now be described. For this purpose, a valve can be provided in the primary drum backwash outlet and the secondary drum backwash outlet to control the pressure drop across the respective backwash outlets from the operating pressure of the strainer to atmospheric pressure. A typical such valve is valve 25 as shown in FIG. 3. Such valves may be normally closed, preventing backwash cleaning action. To initiate backwashing, in such case, each backwash outlet valve may be provided with a timer, for example timer 30 (FIG. 3) which, upon actuation at desired intervals, opens the valves 25, permitting the backwashing action to take place, for example in the case of the upper backwash outlet of the primary drum, in the direction of the arrow C (FIG. 3). Normally, for economy and to better ensure simultaneous performance of backwashing from primary drum backwash slots, it is preferred that the upper and lower primary drum backwash outlets 37 and 37', connected to backwash outlet lines 48 and 48' respectively, be manifolded, as in manifold line 50 (FIG. 7), and a single primary drum backwash valve 25 be used in manifold line 50, as shown in FIG. 7. A similar secondary drum backwash valve 49 can be used in the secondary drum backwash outlet line 41, as also shown in FIG. 7. Both manifold line 50 and line 41 discharge into a common open drain 55.

As further shown in FIG. 7, backwashing can be controlled by means of the pressure drop across the primary or the secondary drums. Differential pressure measuring lines 51 and 52 extend, respectively, into the liquid inlet and outlet lines, and differential pressure measuring line 53 extends into the space between the drums to measure the pressure there. Pressure measuring line 51 leads to a first differential pressure switch 54 and pressure measuring line 52 leads to a second differential pressure switch 56. These switches are connected, respectively to timers 57 and 58. Pressure gages A, B, C and D are provided respectively in lines 52, line 59 connecting switches 54 and 56, and line 51. With such arrangement, differential pressures can be measured (1) from the liquid inlet to the liquid outlet, A-D; (2) across the primary drum, A-B, and (3) across the secondary drum, C-D, and the measured differential pressures can be used to actuate backwashing by means of differential pressure switches 54 and 56. Backwashing also can be controlled by means of timers 57 and 58. For example, a primary control can be by timer but, in the event of plugging of the media strainer inserts in either the primary or the secondary drum before the next timer-actuated backwashing cycle commences, earlier backwashing can be actuated by the secondary, pressure-actuation mechanism. A number of control relays 61 are provided for controlling timer-actuated backwashing across the primary drum and the secondary drum and to avoid simultaneous backwashing.

The apparatus of the invention can be used over a wide range of supply liquid pressures, upwardly of 20 psi. The pressure drop through the apparatus normally is only a few psi, e.g. about 4 psi when the inlet pressure is 150 psi.

In many applications in which the suspended solids have a large range of particle sizes or have different shapes e.g. fibers and spheres, the inventive apparatus is conveniently operated with different types of media strainer inserts in the primary drum and in the secondary drum. For example, the primary drum may be provided with inserts having a comparatively large pore size, thereby effectively removing larger particles, and the secondary drum may be provided with inserts of smaller openings for removing smaller particles.

For such purposes, a large variety of media strainer inserts may be used. For example, such inserts may be in the form of metallic wire mesh cones of varying mesh size; the inserts may be in the form of slotted cylinders or perforated discs of metal or plastic. Alternatively, cones or other shapes may be filled with fibers of stainless steel or other fibers.

The apparatus of the invention is not operated as a centrifuge. Rotation of the drums is at a relatively low speed, typically about 8 to 14 rpm. Applications include, for example, removal of suspended particles from industrial plants, using river, lake or sea water for cooling, descaling, bearing lubrication, spraying, quenching and similar purposes. The inventive apparatus can be used with supply pipeline sizes from 2 to 60 inches diameter or greater. Liquids other than water, for example, acids and other chemicals, paper mill "white water", sewage and coke plant ammonia flushing liquors can also be effectively strained.

The construction and operation of the apparatus of the present invention enables the processing of larger volumes per unit time than previous devices of this general type, and the ability to use two or more different sizes or shapes of mesh or pore size for the strainer inserts in, respectively, the primary drum and the secondary drum, effectively improves overall straining capability and efficiency.

What is claimed is:

1. A strainer of improved liquid volume processing and straining capability, comprising a housing having an inlet for liquid to be strained and an outlet for strained liquid, a vertical drive shaft mounted on a top of the housing, means to rotatably drive the drive shaft, an elongated hollow primary drum mounted on the drive shaft and rotatable therewith, an elongated hollow secondary drum mounted on the drive shaft inside the primary drum and rotatable with the drive shaft, each of the primary and secondary drums having a plurality of perforations extending from a top to a bottom of the respective drums and within which are mounted a corresponding plurality of media strainers, means to introduce pressurized liquid into the inlet and into a space between the housing and the outside of the primary drum, to force the liquid through the strainer inserts in the primary drum into a space between the inside of the primary drum and the outside of the secondary drum and through the strainer inserts in the secondary drum into the hollow interior of the secondary drum and thence out of the housing outlet.

2. A strainer according to claim 1, wherein the strainer inserts in the primary drum have different opening shapes or sizes than openings in the strainer inserts in the secondary drum, whereby a certain shape or size of particles suspended in the liquid are entrapped in the primary drum strainer inserts and particles of a different shape or size are entrapped in the secondary drum strainer inserts.

3. A strainer according to claim 1, further comprising at least one backwash slot inside the housing and outside the primary drum extending the length of the primary drum, each backwash slot being connected to a primary drum backwash outlet which connects to a reduced pressure line, whereby, as the primary drum rotates and the primary drum strainer inserts pass each backwash slot, pressurized liquid within the primary drum forces liquid through the primary drum strainer inserts in the direction of the backwash outlet to flush from the strainer inserts solids entrapped therein.

4. A strainer according to claim 3, wherein the strainer inserts in the primary drum have different opening shape or sizes than openings in the strainer inserts in the secondary drum, whereby a certain shape or size of particles suspended in the liquid are entrapped in the primary drum strainer inserts and particles of a different shape or size are entrapped in the secondary drum strainer inserts.

5. A strainer according to claim 3, further comprising a backwash shoe outside the secondary drum juxtaposed to an outside surface thereof and connected to a secondary drum backwash outlet which connects to a secondary drum reduced pressure line, whereby, as the secondary drum rotates and the secondary drum strainer inserts pass the backwash shoe, pressurized liquid within the secondary drum forces liquid through the secondary drum strainer inserts in the direction of the secondary drum backwash outlet to flush solids entrapped in the secondary drum strainer inserts into the secondary drum reduced pressure line.

6. A strainer according to claim 5, wherein the strainer inserts in the primary drum have different opening shape o sizes than openings in the strainer inserts in the secondary drum, whereby a certain shape or size of particles suspended in the liquid are entrapped in the primary drum strainer inserts and particles of a different shape or size are entrapped in the secondary drum strainer inserts.

7. A strainer according to claim 5, further comprising valve means controlling the pressure in the primary and secondary backwash outlet lines, and means for actuating the normally closed valve means to open the valve means to connect an interior portion of the strainer with atmospheric pressure thereby permitting backwashing action to take place when the strainer inserts in the primary drum pass the backwash slots in the primary drum and when the strainer inserts in the secondary drum pass the backwash shoe.

8. A strainer according to claim 7, wherein the means for actuating the normally closed valve means comprises a timer means for opening the valve means periodically and permitting the backwashing action to take place.

9. A strainer according to claim 8, further comprising a first valve means for connecting the primary drum backwash slots to atmospheric pressure and a second valve means for connecting the secondary drum backwash shoe to atmospheric pressure, first timer means for actuating the first valve means and second timer means for actuating the second valve means.

10. A strainer according to claim 7, wherein the means for actuating the normally closed valve means comprises pressure differential means.

11. A strainer according to claim 10, wherein the pressure differential means comprises a first pressure differential switch responsive to a pressure differential across the primary drum and a second pressure differential switch responsive to pressure differential across the secondary drum.

12. A strainer according to claim 7, wherein the means for actuating the normally closed valve means comprises a combination of timer means and pressure differential means.

13. A strainer according to claim 12, wherein the pressure differential means comprises means to measure the pressure drop across the primary drum and across the secondary drum, and said pressure differential means are operative to open the normally closed valve means responsive to changes in pressure drop across either the primary drum or the secondary drum during time intervals when the valve means is otherwise closed under the influence of the timer means.

14. A strainer of improved straining capacity comprising:
a liquid-tight housing having a generally cylindrical body, a closed bottom and a removable head;

a vertical drive shaft mounted on the housing head and having one end thereof extending therethrough and into the interior of the housing body;

means to rotate the drive shaft about another end thereof;

an outer, primary drum mounted on the one end of the drive shaft and rotatable therewith, said primary drum comprising a side wall, a closed top wall, an open bottom and provided with a first plurality of perforations extending through the side wall of the primary drum;

primary media strainer plugs inserted into corresponding perforations in the primary drum;

an inner, secondary drum mounted on the one end of the drive shaft and rotatable therewith concentrically inside said primary drum, said secondary drum comprising a side wall, a closed top wall, an open bottom and provided with a second plurality of perforations extending through the side wall of the secondary drum;

secondary media strainer plugs inserted into corresponding perforations in the secondary drum, and a circular plate having a central aperture forming an annular wall, an end of the secondary drum adjacent the open bottom thereof extending into said aperture;

means between the side wall of the secondary drum adjacent the open bottom thereof and the wall of said central aperture to form therebetween a substantially liquid-tight slidable seal;

a generally cylindrical member having upper and lower open ends, the upper end of said cylindrical member being disposed about the open bottom of the primary drum and the lower end of said cylindrical member being affixed to the closed bottom of the housing;

means between the side wall of the primary drum adjacent the open bottom thereof and the upper end of said cylindrical member to form therebetween a substantially liquid-tight slidable seal, and means to introduce a liquid material to be strained into a space formed by the housing, an outer surface of the primary drum and an outer surface of said cylindrical member, and to remove strained liquid from a space formed by an inner surface of the secondary drum, an inside surface of said cylindrical member and a lower surface of said circular plate.

15. A strainer according to claim 14, wherein the perforations in the primary and secondary drums are threaded and the primary and secondary media strainer plugs are correspondingly threaded for threaded mounting in the respective perforations.

16. A continuous self-cleaning strainer comprising:

a liquid-tight housing having a generally cylindrical body, a closed bottom and a removable head;

a vertical drive shaft mounted on the housing head and having one end thereof extending therethrough and into the interior of the housing body;

means to rotate the drive shaft about another end thereof;

an outer, primary drum mounted on the one end of the drive shaft and rotatable therewith, said primary drum comprising a side wall, a closed top wall, an open bottom and provided with a first plurality of threaded perforations extending through the side wall of the primary drum;

primary threaded media strainer plugs inserted into corresponding perforations in the primary drum;

an upper primary drum backwash slot extending between an exterior surface of the side wall of the primary drum to an inner surface of the housing body and extending from the closed top wall of the primary drum to approximately one-half the distance to the open bottom of the primary drum;

a lower primary drum backwash slot extending between an exterior surface of the side wall of the primary drum to an inner surface of the housing body, spaced approximately 180 degrees from the first primary drum backwash slot, and extending from the open bottom of the primary drum to approximately one-half the distance to the closed top wall of the primary drum;

upper and lower primary drum backwash outlets extending through the side wall of the housing and respectively connected to the upper and lower primary drum backwash slots and connecting s id slots to atmospheric pressure whereby, when media strainer plugs mounted in the primary drum pass the upper and lower primary drum backwash slots, solids entrained in said media strainer plugs are washed therefrom and removed through the respective primary drum backwash outlets;

an inner, secondary drum mounted on the one end of the drive shaft and rotatable therewith concentrically inside said primary drum, said secondary drum comprising a side wall, a closed top wall, an open bottom and provided with a second plurality of threaded perforations extending through the side wall of the secondary drum;

secondary threaded media strainer plugs inserted into corresponding perforations in the secondary drum;

a secondary drum backwash shoe extending from the top wall of the secondary drum to the open end of the secondary drum and having an outlet extending below the open end of the secondary drum;

a secondary drum backwash outlet pipe extending through the bottom of the housing and connected to the outlet of the secondary drum backwash shoe and thereby connecting the secondary drum backwash shoe to atmospheric pressure, whereby, when media strainer plugs mounted in the secondary drum pass the secondary drum backwash shoe, solids entrained in said media strainer plugs are washed therefrom and removed through the secondary drum backwash outlet, and means to introduce a liquid material to be strained into a space between the housing and an outer surface of the primary drum and to remove strained liquid from a space formed by the inner surface of the secondary drum, a circular plate surrounding and in slidably sealing relationship with the side wall of the secondary drum adjacent the open bottom thereof and a cylindrical member depending from said circular plate and in slidably sealing relationship with the side wall of the primary drum adjacent the open bottom thereof.

* * * * *